(12) United States Patent  (10) Patent No.: US 8,480,433 B2
Huang  (45) Date of Patent: Jul. 9, 2013

(54) ON-BOARD DIAGNOSTIC ADAPTER

(75) Inventor: Wen-Huo Huang, Hsinchu County (TW)

(73) Assignee: Sung Jung Minute Industry Co., Ltd., Cyonglin Township, Hsinchu County (TW)

( * ) Notice: Subject to any disclaimer, the term of this patent is extended or adjusted under 35 U.S.C. 154(b) by 204 days.

(21) Appl. No.: 13/080,340

(22) Filed: Apr. 5, 2011

(65) Prior Publication Data

US 2012/0258628 A1 Oct. 11, 2012

(51) Int. Cl.
*H01R 13/66* (2006.01)

(52) U.S. Cl.
USPC ....... 439/620.21; 701/31.4; 439/34; 439/76.1

(58) Field of Classification Search
USPC .... 439/620.21, 76.1, 34, 638; 701/31.4–31.5, 701/33.2
See application file for complete search history.

(56) References Cited

U.S. PATENT DOCUMENTS

| | | | | |
|---|---|---|---|---|
| 4,998,183 A * | 3/1991 | Chiang | ..................... | 361/679.32 |
| 5,217,394 A * | 6/1993 | Ho | ........................... | 439/620.21 |
| 5,442,170 A * | 8/1995 | Kreft et al. | ..................... | 250/229 |
| 7,447,574 B1 * | 11/2008 | Washicko et al. | ............ | 701/33.4 |
| 7,553,173 B2 * | 6/2009 | Kowalick | ..................... | 439/133 |
| 7,778,749 B2 * | 8/2010 | McGee et al. | ............... | 701/33.2 |
| 2004/0153597 A1 * | 8/2004 | Kanai et al. | ................... | 710/305 |
| 2004/0189808 A1 * | 9/2004 | Tanaka | ....................... | 348/207.1 |

FOREIGN PATENT DOCUMENTS

| | | |
|---|---|---|
| TW | M332617 | 5/2008 |
| TW | M338779 | 8/2008 |

* cited by examiner

*Primary Examiner* — Xuong Chung Trans
(74) *Attorney, Agent, or Firm* — Muncy, Geissler, Olds & Lowe, PLLC

(57) ABSTRACT

An on-board diagnostic (OBD) adapter includes an input connector, a first output connector and a second output connector. The input connector is electrically connected to the first and second output connectors through a circuit board. The input connector is inserted into a socket of the OBD to capture vehicle driving information from the OBD and transmit the vehicle driving information to the first and second output connectors. The first output connector is formed in a specification the same as the socket of the OBD. The second output connector is formed in a specification different from the socket of the OBD. The adapter provides connection with the OBD with the same or different connector to improve usability.

13 Claims, 6 Drawing Sheets

ON-BOARD DIAGNOSTIC ADAPTER

FIELD OF THE INVENTION

The present invention relates to an on-board diagnostic adapter and particularly to an adapter inserted into a socket of an on-board diagnostic to transmit vehicle driving information.

BACKGROUND OF THE INVENTION

An on-board diagnostic (OBD in short hereinafter) device is installed on a vehicle and connected to a computer of the vehicle to get executing conditions and set data of the vehicle computer to determine whether the vehicle has malfunction.

In general, a driver usually installs a display, such as a head up display (HUD in short hereinafter), through an adapter inserted into a socket of the OBD to capture and display vehicle driving information. For instance, R.O.C. patent No. M338779 discloses an HUD device connected to a socket of an OBD-II to get information and supply power, and also perform decoding and conversion. The HUD device includes a 16 pin to 4 pin adapter inserted into an OBD-II socket, a metal conductive wire set connected to the adapter, an electronic integrated host having a communication conversion unit processor and a control circuit board with HUD function. When a vehicle is started to form electrical connection, power supply is provided and signal is captured. When in use, the communication conversion unit processor accesses related signals and decodes various communication protocol signals to become the input signals required for the display for displaying.

R.O.C. patent No. M332617 also discloses a power adapter for a socket of an OBD that includes an adapter body equipped with a power input connector and at least one power output connector. The power input connector and OBD socket respectively conform to ISO15031-3 (i.e. SAE J1962) specification and are connectable with each other. By connecting the power input connector to the OBD socket, power supply can be provided from the OBD to drive an external electronic device through the power output connector. Thus, through the power adapter, the electronic device can be driven via a steady power source without an external power supply or power supply circuit, and adaptability of the OBD socket is also improved.

The aforesaid conventional OBD sockets are respectively connected to a connector to couple with electronic devices with different transmission specifications; for an example, the specification of the OBD socket can be converted to a different transmission format of the external electronic device. In the event that connecting to external devices with the OBD specification is required, such as a garage computer, the adapter must be removed and inserted again after usage. This causes a lot of inconvenience in use.

SUMMARY OF THE INVENTION

The primary object of the present invention is to overcome the aforesaid drawback of the conventional adapters that have to be removed according to various using conditions.

To achieve the foregoing object, the present invention provides an OBD adapter that includes an input connector, a first output connector and a second output connector. The input connector, the first output connector and the second output connector are electrically connected to a circuit board. The input connector is inserted into a socket of the OBD to connect to the OBD and capture vehicle driving information from the OBD, and transmit the vehicle driving information to the first and second output connectors through the circuit board. The adapter has a first transmission path to transmit the vehicle driving information from the input connector to the first output connector, and a second transmission path to transmit the vehicle driving information from the input connector to the second output connector. The first output connector is formed in a specification the same as the socket of the OBD, while the second output connector is formed in another specification different from the socket of the OBD. Thus the adapter provides connectors with the same or different specifications from the socket of the OBD at the same time to avert the need of changing the adapters because of different connector specifications.

In one embodiment of the invention, the first output connector has at least one switch device electrically connected to the input connector, the first output connector and the second output connector so that the first transmission path or second transmission path can be selected to be switched in the adapter. The adapter further includes a housing to hold the circuit board that has a first opening, a second opening and a third opening to couple respectively with the input connector, first output connector and second output connector. The input connector and first output connector may have respectively a groove, while the housing has a flange respectively on the first and second openings to latch with the groove. Moreover, the socket, input connector and first output connector respectively conform to J1962 DLC specification. The input connector has sixteen input pins connected to the circuit board. The first output connector also has sixteen output pins connected to the circuit board. The circuit board has a transmission circuit bridging the input pins and output pins. In addition, the circuit board further has a transceiver unit connected to the input pins to identify the vehicle driving information, a processing unit connected to the transceiver unit to convert the vehicle driving information, and a transmission unit connected to the processing unit to transmit the converted vehicle driving information. The transceiver unit may include multiple transceivers connected to different input pins to get vehicle driving information from various vehicle makers. The circuit board has a first manual switch between the transceivers and the processing unit to determine which transceiver to be connected to the processing unit.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
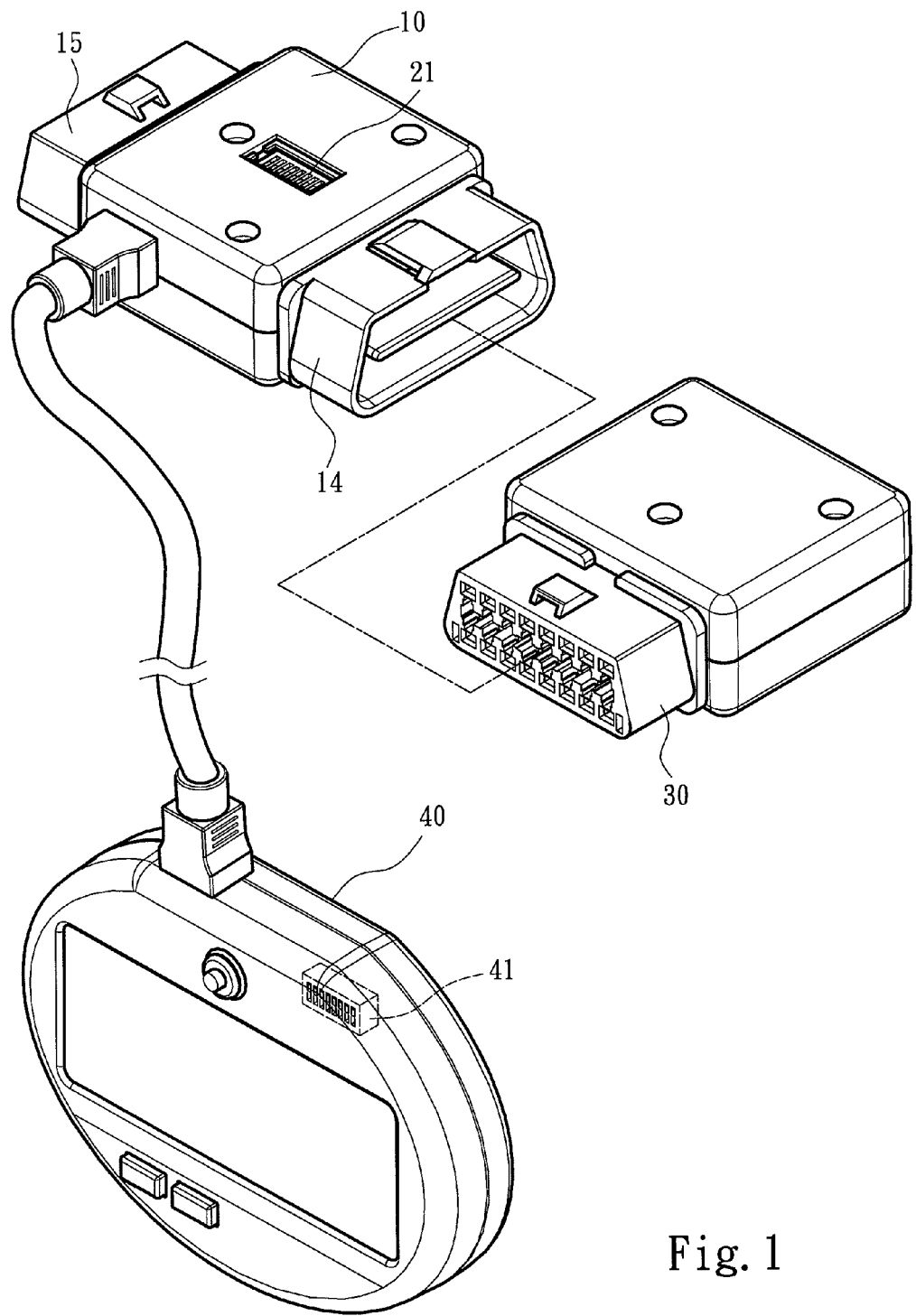
FIG. 1 is a perspective view of the invention.
Figure 2:
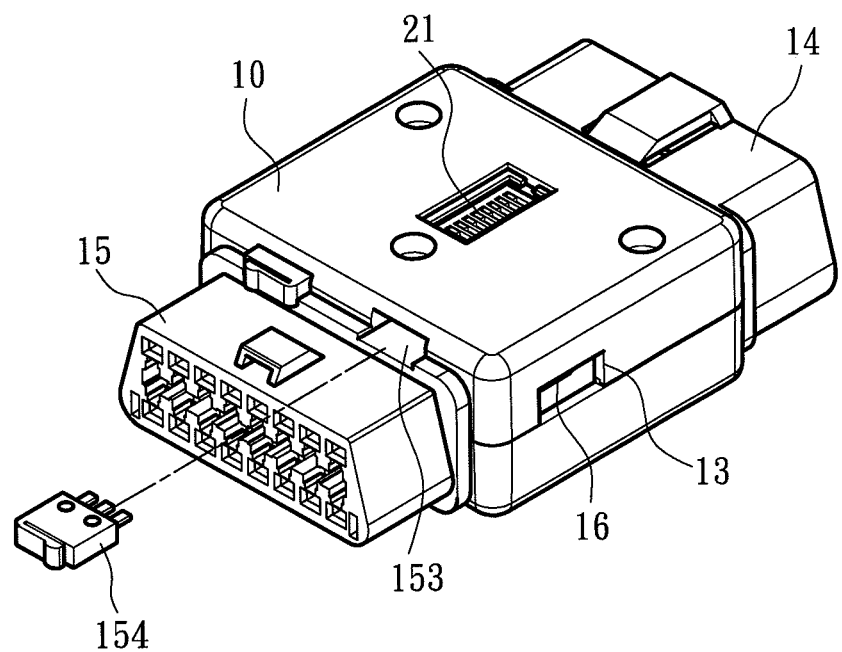
FIG. 2 is another perspective view of the invention.

Please refer to FIG. 1, the present invention aims to provide an on-board diagnostic (OBD in short) adapter inserted into a socket 30 of the OBD to capture vehicle driving information and connect to an external device, such as a head up display (HUD in short) 40 shown in the drawing, to display the vehicle driving information, such as vehicle speed, tire pressure, oil temperature and the like. Also referring to FIGS. 2 and 3, the adapter includes a housing 10 with a first opening 11, a second opening 12 and a third opening 13 formed thereon to couple respectively with an input connector 14, a first output connector 15 and a second output connector 16. The input connector 14 and first output connector 15 have respectively a groove 142 and 152, and the housing 10 has flanges 111 and 121 formed respectively on the first and second openings 11 and 12 to latch with the grooves 142 and 152 so that the input connector 14 and first output connector 15 can be firmly held on the housing 10. The housing 10 also holds a circuit board 20 inside. The input connector 14 has sixteen input pins 141 connected to the circuit board 20. The first output connector 15 also has sixteen output pins 151 connected to the circuit board 20. The second output connector 16 is fastened to the circuit board 20 and exposed outside the housing 10 through the third opening 13. The input connector 14, first output connector 15 and second output connector 16 form electrical connection among them through the circuit board 20. The adapter has a first transmission path to transmit the vehicle driving information from the input connector 14 to the first output connector 15, and also has a second transmission path to transmit the vehicle driving information from the input connector 14 to the second output connector 16.

In the invention, the input connector 14 and socket 30 of the OBD respectively conform to J1962 DLC specification so that the input connector 14 can be inserted to the socket 30 to connect with the OBD to get the vehicle driving information. The first output connector 15 and socket 30 also respectively conform to J1962 DLC specification, but the second output connector 16 and socket 30 are formed in different specifications. The second output connector 16 can be a USB, Mini USB or Micro USB interface. Thus the second output connector 16 can be connected to an external device not with the OBD specification (J1962 DLC), such as the HUD 40, a mobile phone, a PDA (Personal Digital Assistant) or the like. The first output connector 15 can also be an extension of the socket 30 of the OBD. When connecting an external device with the OBD specification is required, such as a garage computer, there is no need to remove the adapter but can directly connect to the first output connector 15 of the adapter. Hence through the adapter of the invention, devices with the same or different OBD specifications can be coupled.

Figure 3:
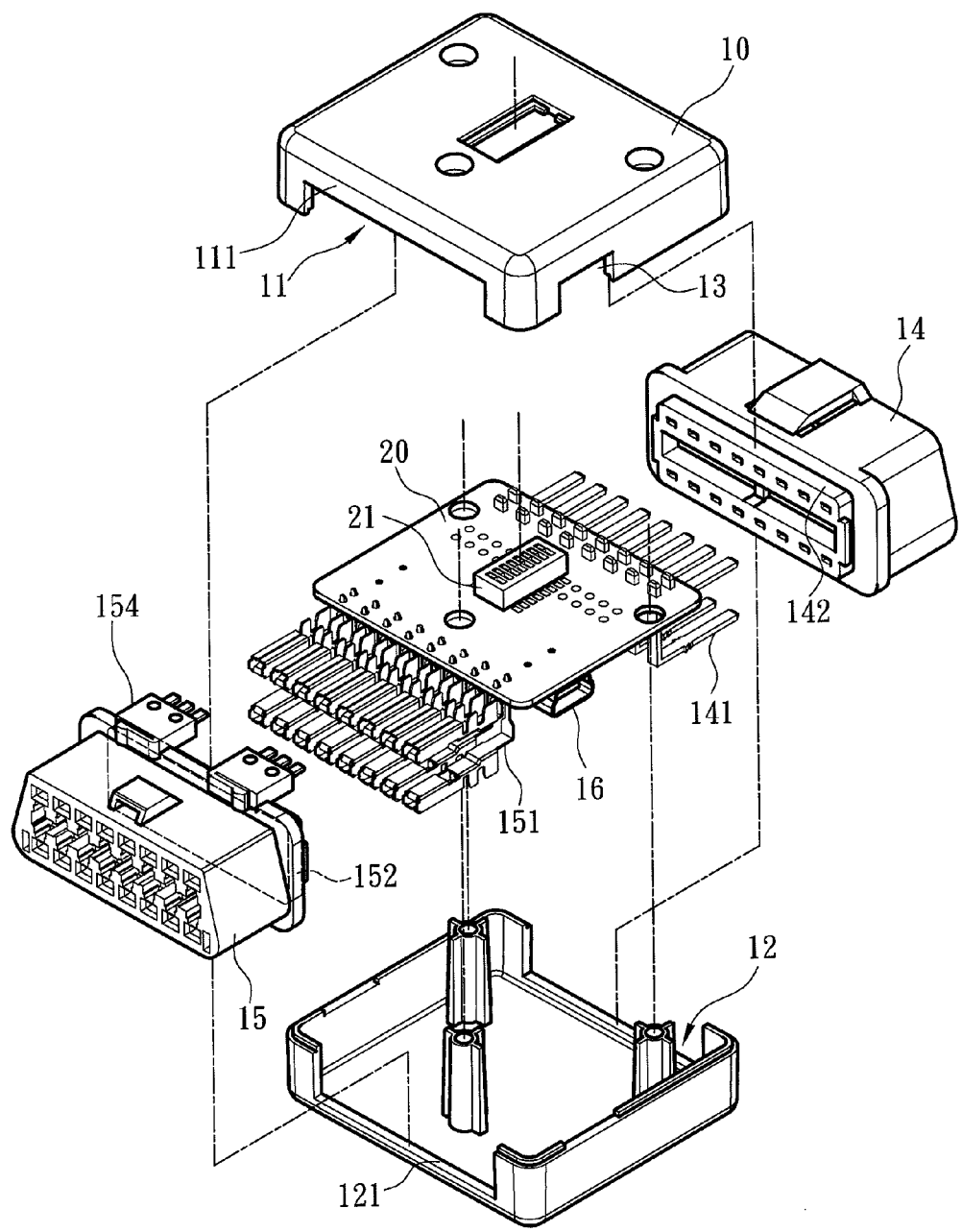
FIG. 3 is an exploded view of the invention.
Figure 4:
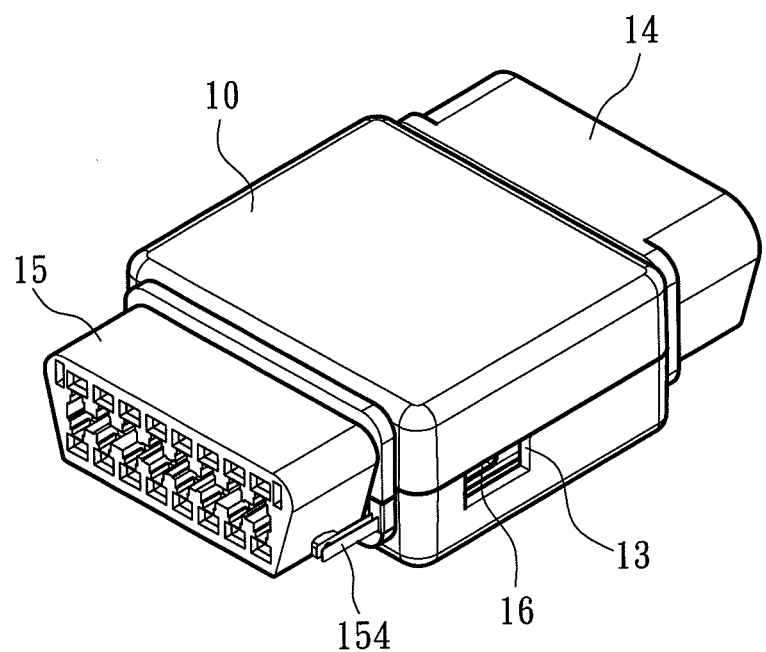
FIG. 4 is a perspective view of another embodiment of the invention.
Figure 5:
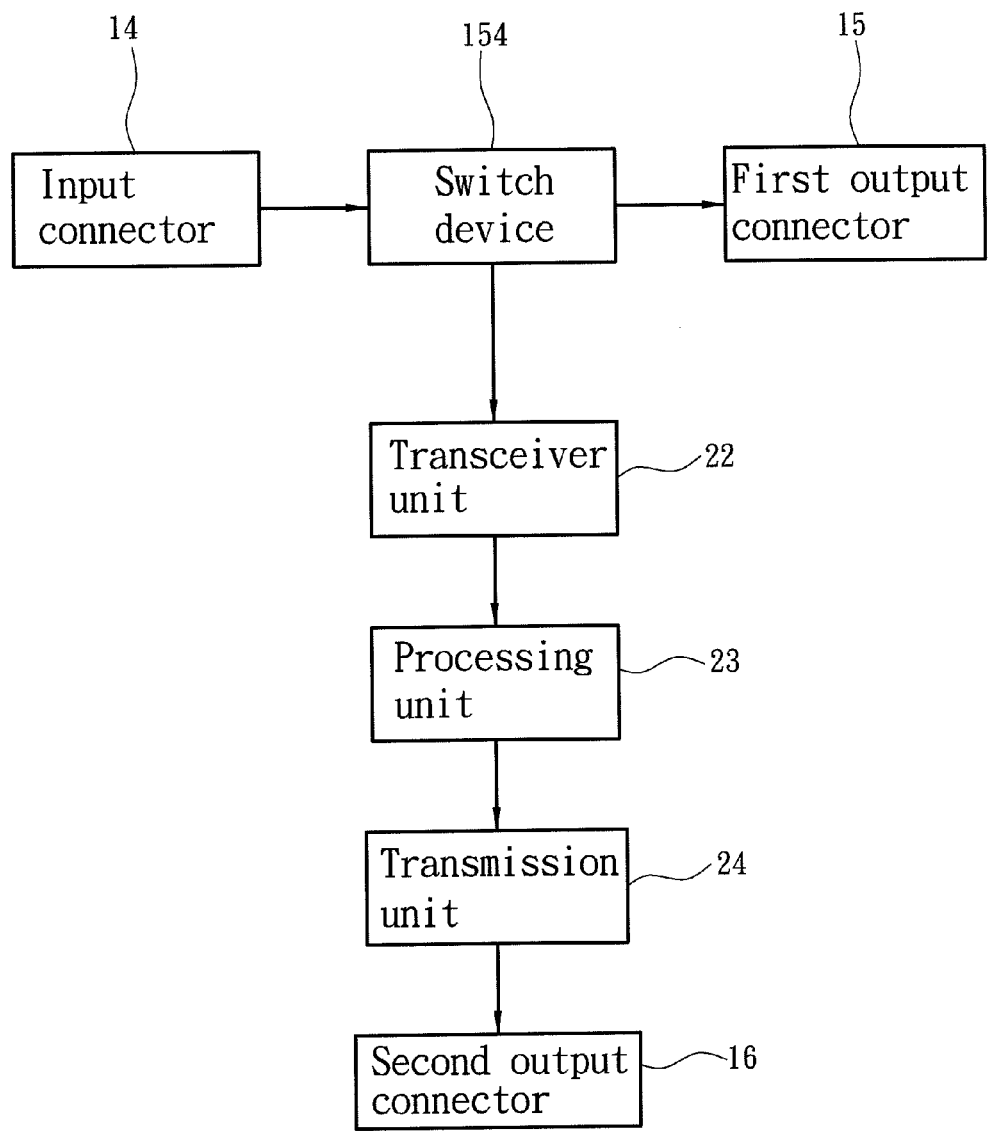
FIG. 5 is a circuit block diagram of the invention.

Also referring to FIG. 5, as the sockets 30 of the OBDs in various vehicle makers have different pin layouts, a mating adapter is needed to transmit accurate information. The adapter of the invention is adaptable to the sockets 30 of the OBDs in various vehicle makers. The circuit board 20 further has a transceiver unit 22 connected to the input pins 141 of the input connector 14, a processing unit 23 linked to the transceiver unit 22 and a transmission unit 24 linked to the processing unit 23. Through the input pins 141 of the input connector 14, the transceiver unit 22 can get the vehicle driving information of various vehicle makers, and also identify the format of the vehicle driving information, then send to the processing unit 23 for interpretation and conversion and send to the transmission unit 24, and further transmit to an external device through the second output connector 16 connecting to the transmission unit 24. Moreover, the first output connector 15 has at least one notch 153 to hold at least one switch device 154 connected to the circuit board 20. The switch device 154 can be a micro-switch as shown in FIG. 3, or two conductive plates at one side of the first output connector 15 as shown in FIG. 4. Through the circuit board 20 electrically connecting to the input connector 14, first output connector 15 and second output connector 16, the first or second transmission path can be selected to be switched in the adapter. For instance, when the first output connector 15 is inserted to a mating plug, the micro-switch or two conductive plates can be pressed to form conduction to cut off the second transmission path while set ON the first transmission path to avoid damage of the transceiver unit 22, processing unit 23 and transmission unit 24 on the second transmission path due to overcurrent.

Figure 6:
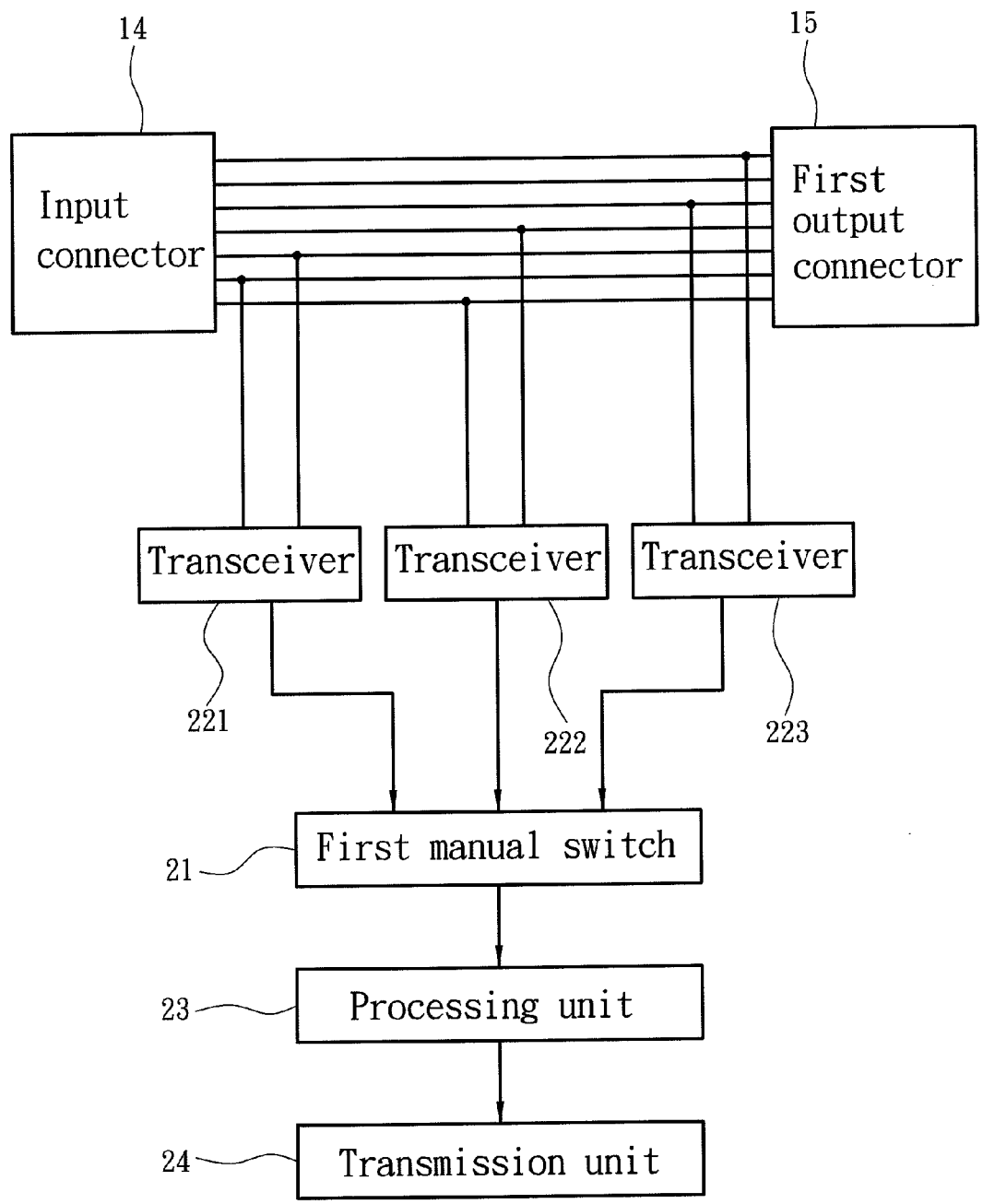
FIG. 6 is another circuit block diagram of the invention.

Please refer to FIG. 6 for another embodiment. The transceiver unit 22 includes a plurality of transceivers 221, 222 and 223 that are connected to different input pins 141 of the input connector 14 to receive different vehicle driving information of various vehicle makers. The circuit board 20 has a first manual switch 21 bridging the transceivers 221, 222 and 223 and the processing unit 23. When the adapter is connected to a vehicle of different maker, stirring the first manual switch 21 to allow the processing unit 23 to connect to one of the transceivers 221, 222 and 223 to get the vehicle driving information desired. The transmission unit 24, aside from connecting to the second output connector 16 to perform wired transmission through a transmission cable, also can be a wireless transceiver to perform wireless transmission, such as Bluetooth, infrared or the like, to transmit the vehicle driving information to a selected device, such as the HUD 40. Then through a CAN (Controller Area Network) bus (not shown in the drawings) and a second manual switch 41 in the HUD 40, the vehicle driving information can be analyzed and displayed.

As a conclusion, the adapter of the invention mainly includes a first output connector 15 formed in the same contour and specification as the socket 30 of the OBD and a second output connector 16 formed in a specification different from the socket 30 of the OBD. Thus the second output connector 16 can be connected to an external device with different OBD specification. The first output connector 15 can also be an extension of the socket 30 of the OBD to connect to an external device without removing the adapter. The circuit board 20 can also include a plurality of transceivers 221, 222 and 223 corresponding to different vehicles in various vehicle makers so that the adapter of the invention can be adapted to various vehicle makers.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An on-board diagnostic adapter inserted into a socket of an on-board diagnostic to capture vehicle driving information of the on-board diagnostic, comprising:
   an input connector electrically connected to a circuit board and inserted into the socket to connect to the on-board diagnostic;
   a first output connector which is electrically connected to the circuit board to form electric connection with the input connector and formed in a specification the same as the socket of the on-board diagnostic, the adapter including a first transmission path to transmit the vehicle driving information from the input connector to the first output connector; and
   a second output connector which is electrically connected to the circuit board to form electric connection with the input connector and formed in a specification different from the socket of the on-board diagnostic, the adapter including a second transmission path to transmit the vehicle driving information from the input connector to the second output connector.

2. The on-board diagnostic adapter of claim 1 further including a housing to hold the circuit board, the housing including a first opening, a second opening and a third opening to couple respectively with the input connector, the first output connector and the second output connector.

3. The on-board diagnostic adapter of claim 2, wherein the input connector and the first output connector include respectively a groove and the housing includes flanges respectively on the first opening and the second opening to latch on the groove.

4. The on-board diagnostic adapter of claim 1, wherein the second output connector is selectively a USB, a Mini USB or a Micro USB interface.

5. The on-board diagnostic adapter of claim 1, wherein the socket, the input connector and the first output connector respectively conform to J1962 DLC specification.

6. The on-board diagnostic adapter of claim 1, wherein the input connector includes sixteen input pins connected to the circuit board and the first output connector includes sixteen output pins connected to the circuit board.

7. The on-board diagnostic adapter of claim 6, wherein the circuit board includes a transceiver unit connected to the input pins to identify the vehicle driving information, a processing unit connected to the transceiver unit to convert the vehicle driving information, and a transmission unit connected to the processing unit to transmit the converted vehicle driving information.

8. The on-board diagnostic adapter of claim 7, wherein the transceiver unit includes a plurality of transceivers connected to varying input pins to receive the vehicle driving information from various vehicle makers.

9. The on-board diagnostic adapter of claim 8, wherein the circuit board includes a first manual switch connected to the transceivers and the processing unit to form electric connection between the processing unit and one of the transceivers.

10. The on-board diagnostic adapter of claim 9, wherein the second output connector is electrically connected to an external device which includes a second manual switch.

11. The on-board diagnostic adapter of claim 7, wherein the transmission unit is connected to the second output connector.

12. The on-board diagnostic adapter of claim 7, wherein the transmission unit is a wireless transceiver.

13. The on-board diagnostic adapter of claim 1, wherein the first output connector includes at least one switch device and at least one notch to hold the switch device, the switch device being electrically connected to the input connector, the first output connector and the second output connector to switch the adapter to the first transmission path or the second transmission path.

* * * * *